United States Patent
Cleveland et al.

[15] 3,650,349
[45] Mar. 21, 1972

[54] FOUR WHEEL DRIVE VEHICLE INCORPORATING LIMITED STRIP INTERAXLE DIFFERENTIAL

[72] Inventors: Richard E. Cleveland, Garrett; Jack M. Fisher, Muncie; Jack G. Glaze, Auburn; William G. Jeakle, Muncie, all of Ind.

[73] Assignee: Borg-Warner Corporation, Chicago, Ill.

[22] Filed: June 1, 1970

[21] Appl. No.: 42,172

[52] U.S. Cl..................................................180/44, 74/711
[51] Int. Cl..............................................................B60k 17/34
[58] Field of Search............................180/44, 24.09; 74/711

[56] References Cited

UNITED STATES PATENTS

| | | | |
|---|---|---|---|
| 2,228,581 | 1/1941 | Olen | 180/44 UX |
| 2,821,096 | 1/1958 | Lyeth, Jr. | 74/711 |
| 2,971,404 | 2/1961 | Thornton | 74/711 |
| 3,224,299 | 12/1965 | Holdeman et al. | 74/711 |
| 3,264,901 | 8/1966 | Ferbitz et al. | 180/44 UX |
| 3,390,593 | 7/1968 | Brownyer | 180/44 UX |

*Primary Examiner*—A. Harry Levy
*Attorney*—Donald W. Banner, William S. McCurry and John W. Butcher

[57] ABSTRACT

A torque transfer mechanism incorporated in a multiple path drive system for a vehicle having plural pairs of traction wheels, the torque transfer mechanism being disposed between a source of input torque and at least a pair of drive axles, each associated with a pair of traction wheels in which the torque transfer mechanism includes an input member having a central axis, a casing member driven by the input member, a bevel gear system driven by the input member and a pair of output shafts coaxial with the input member, extending from an opposite side of the casing said output shafts being coaxial and telescoped one within the other.

6 Claims, 3 Drawing Figures

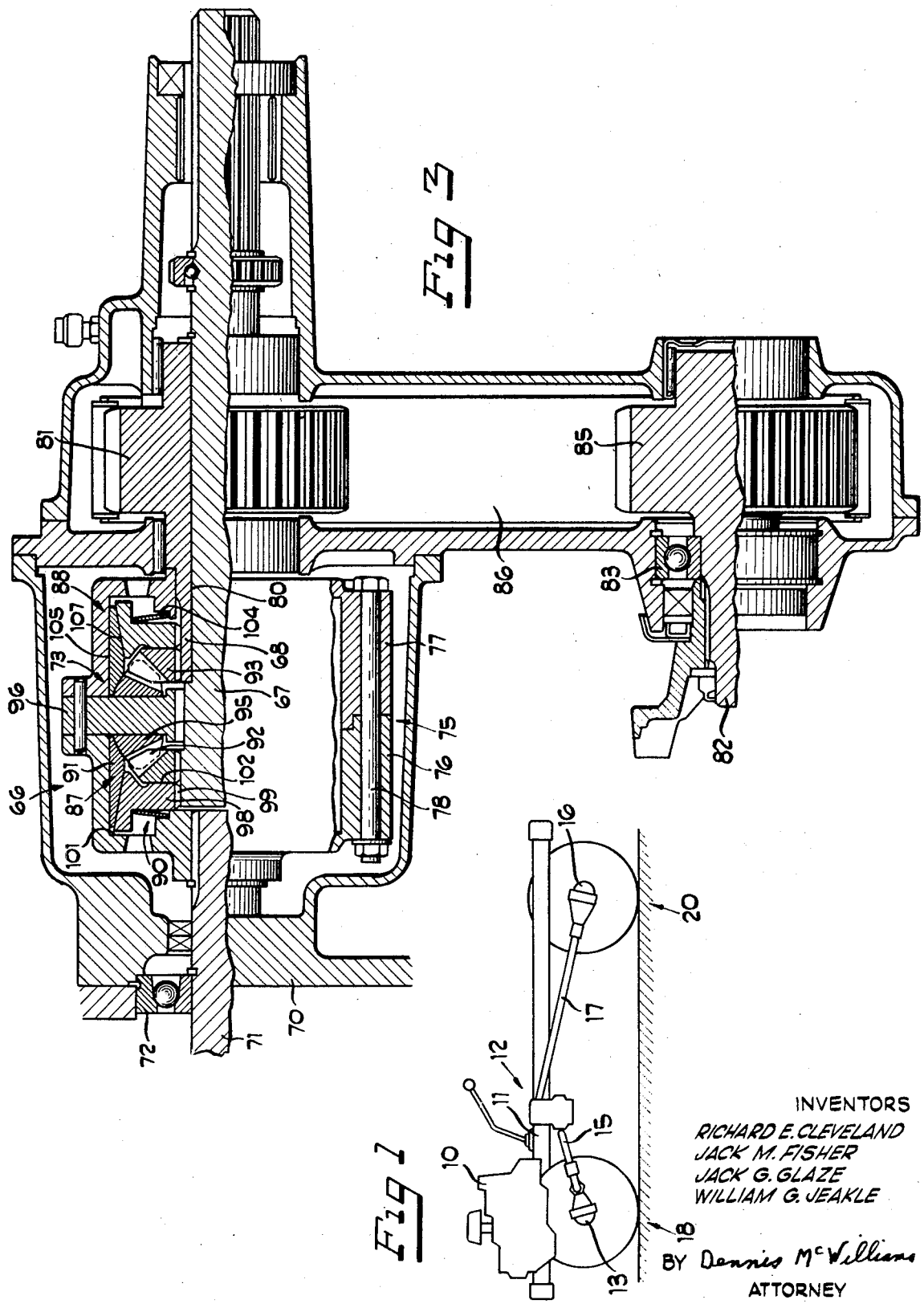

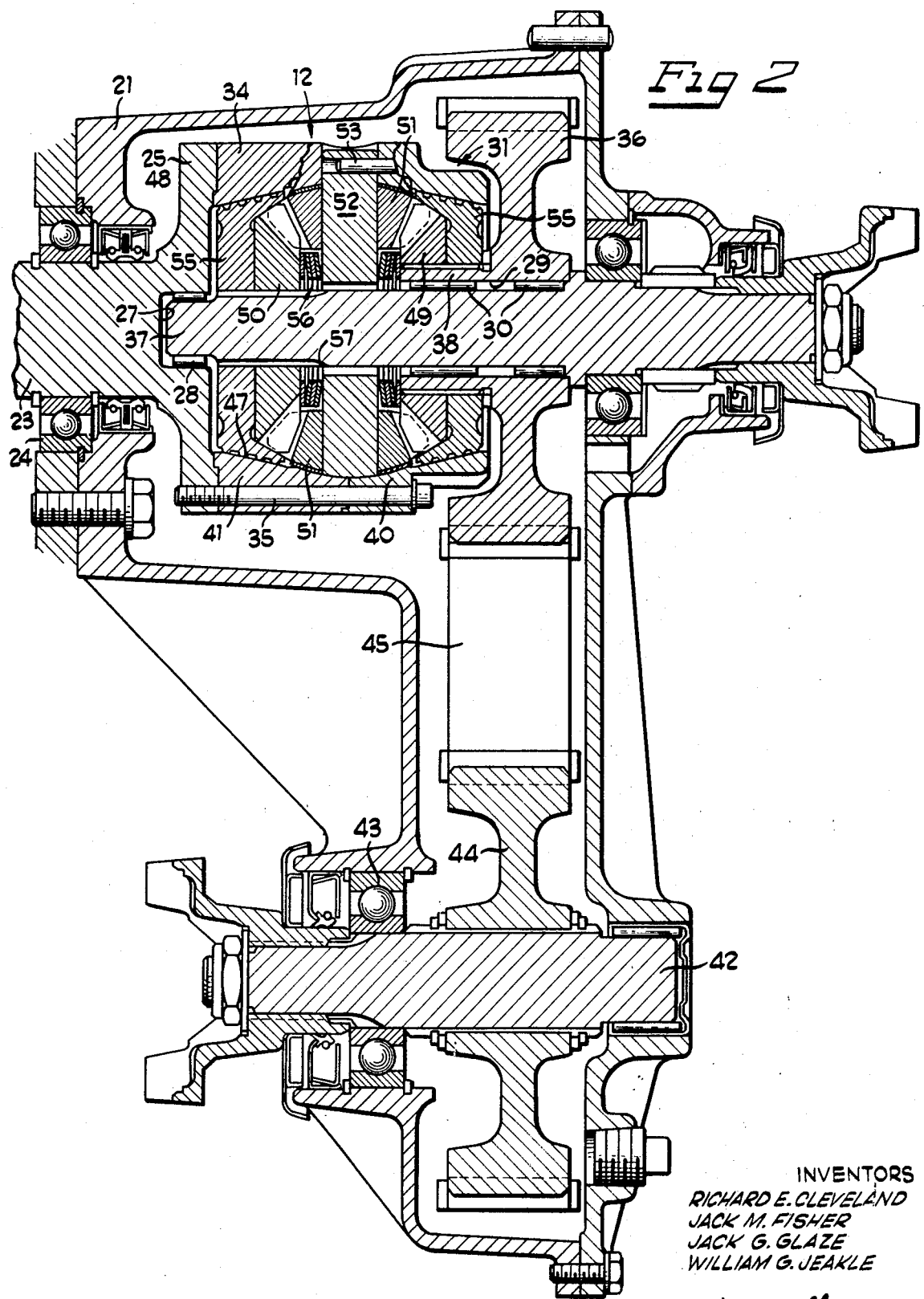

3,650,349

FOUR WHEEL DRIVE VEHICLE INCORPORATING LIMITED STRIP INTERAXLE DIFFERENTIAL

SUMMARY OF THE INVENTION

This invention relates to torque transfer mechanisms adapted to be incorporated in a multiple path drive system, for example, a four wheel drive system, and more particularly, to a system including a torque transfer mechanism adapted to receive an input torque from a prime mover and to transmit torque to a plurality of drive axles. One embodiment of the torque transfer mechanism includes a limited slip differential of the bevel gear type having an input shaft and concentric therewith a pair of telescoped output shafts, each of which is adapted to be connected to a drive axle.

It is well recognized in the art that the tractive efforts of a vehicle are substantially improved if driving torque is applied to more than one axle. This concept underlies the employment of known four wheel drive systems in military vehicles or vehicles intended for operation over unimproved terrain. However, certain problems arise in the provision of known four wheel drive systems which have thus far precluded their employment in pneumatic tired commercial and passenger vehicles.

If all four wheels are positively driven by the engine, a severe amount of tire scraping or cornering scrub occurs as the vehicle negotiates curves or turns. Under such conditions, the front wheels must run through an arc of greater radius than that of the rear wheels, and therefor, tend to rotate faster than the rear wheels. Further, in such a system, slight differences in effective wheel radii caused by inevitable differences in tire inflation, tread wear, or variations in loading, result in the occurrence of what is known as circumferential scrub. Under such conditions, the wheels having smaller radii necessarily tend to rotate faster than those having larger radii while traversing the same distance. If the wheels are positively driven together at the same angular speed by the drive system, then on corners the front wheels are bodily scraped over the ground and on straight travel the wheels having smaller radii are bodily scraped over the ground surface. Tires will not long withstand such abuse. In addition, undue stresses or windup occurs in the driving parts, and fuel consumption is excessive.

One approach to solving the problems inherent in such a system has been to provide a manually operable clutch or disengageable gear enabling the front wheels of the vehicle to be selectively engaged or disengaged for positive drive effort. Thus, the front wheels would only be locked into engagement for four wheel drive when surface conditions would permit. Such engagement would normally occur when the vehicle was traveling on unpaved surfaces. When the vehicles was traveling over paved surfaces, the front wheels would be disengaged and the standard rear wheel drive would propel the vehicle.

Much effort has been devoted to providing a torque transfer mechanism which acts as a third differential in a four wheel drive system, such that front and rear drive shafts would serve respectively to drive front and rear differentials, the shafts being powered from the engine through a center or third differential. Such a differential system clearly permits overspeeding of any one or more of the wheels as a result of rounding corners, or of certain wheels having a smaller effective radius than others.

However, certain problems arise in connection with this type of system. For instance, if one wheel should encounter a slippery or icy patch of ground and lose traction, it will spin freely and the differential will cause the other wheels to exert no driving torque. Manually operable locking means have been incorporated into such three differential systems which, when engaged, eliminate differential action between the drive shafts and positively lock the driven parts together. These are, however, inherently limited in effectiveness.

Other four wheel drive systems have been proposed which incorporate a center differential which will automatically provide for locking out or inhibiting differential action whenever limited free ranges of differential action are exceeded. Such devices are operative to automatically restore such action when the tendency to exceed the range ceases. One such system is shown and described in U.S. Pat. No. 2,796,941, issued to Claude Hill.

As will be apparent, however, such a system requires the addition of many structural elements, and results in a mechanism which is both costly and cumbersome.

The present invention is directed to providing a torque transfer mechanism which will provide an initial predetermined minimal resistance to differentiation between the front and rear drive shafts which is easily overcome when differential action is desired. This invention is adapted to provide such a result with the addition of a minimum number of operating parts, and is further adapted to provide such a result in a structural arrangement which is most compact and economical.

The present invention also provides a torque transfer mechanism which achieves such a result independently of any action by the driver and eliminates the need for an extra shift lever since no shifting is required to engage the four wheel drive.

BRIEF DESCRIPTION OF THE DRAWINGS

FIG. 1 is a perspective view of one embodiment of the present multiple path drive system shown schematically on an automotive vehicle.

FIG. 2 is an enlarged view in section of the torque transfer mechanism.

FIG. 3 is an enlarged view partially in section of another embodiment of the invention.

DESCRIPTION OF THE PREFERRED EMBODIMENT

There is illustrated in FIG. 1 one type of automotive vehicle wherein the torque transfer mechanism of the present invention is particularly useful. The vehicle includes a prime mover 10 and a transmission 11 connected to the prime mover. A torque transfer mechanism 12 is connected to the transmission 11 and adapted to transmit torque to a front drive axle assembly 13 through a torque input member here shown as a drive shaft 15 and a rear drive axle assembly 16 through a torque input member here shown as a drive shaft 17. The front axle assembly 13 and rear axle assembly 16 are adapted to drive front and rear pairs of traction wheels 18 and 20 respectively.

Referring now to FIG. 2, in which one embodiment of the torque transfer mechanism 12 is shown, the torque transfer mechanism 12 includes a housing 21. An input shaft 23 driven by the transmission 11 is shown journaled for rotation in a bearing assembly 24 which is carried in the housing 21. The input shaft 23 includes a flange section 25. The torque transfer mechanism 12 includes a limited slip differential 31 driven by the input shaft 23. The differential 31 includes a casing 34 which is connected to input shaft 23 at flange portion 25 such as by bolts 35. The differential also includes a pair of relatively rotatable output shafts 37 and 38 which are adapted to transmit rotative effort to load receiving members such as the drive shafts 17 and 15 respectively. The shaft 37 is journaled for rotation within a cavity 27 defined by the input shaft 23 and is supported in the cavity 27 by a bearing assembly 28. The shaft 37 is coaxial with the input shaft 23.

The shaft 38 is hollow and defines a circular cavity 20. The shaft 38 is also coaxial with input shaft 23. The shaft 37 extends through the cavity 29 and is journaled within the cavity for relative rotation with respect to shaft 38 by bearing assemblies 30. The shaft 38 is connected to a rotary drive member 36.

In the lower portion of the housing 21, a shaft 42 is supported for rotation by a bearing assembly 43 carried in the housing. The shaft 42 is adapted to be connected to the drive shaft 15. A rotary drive member 44 is carried by the shaft 42 and connected to the shaft for rotation therewith. A chain 45 drivingly connects the rotary drive members 36 and 44 and serves to complete the path to transmit torque from the output shaft 38 to the drive shaft 15.

The casing 34 is formed by a pair of generally cup-shaped sections 40 and 41 retained in abutting relation by the bolts 35. The section 41 abuts and is connected to the flange portion 25.

Each of the sections 40 and 41 define a cavity including a generally frustoconical shaped surface 47 which surfaces form a pair of spaced apart, truncated cone-shaped drums 48 concentrically disposed with respect to the longitudinal center line of the shafts 37 and 38. The drums are formed such that the conical surfaces 47 converge toward a point exterior of the casing 34.

To effect transmission of rotational effort to the output shafts 37 and 38 while allowing for relative rotational movement between them, a bevel gear system is provided within the differential casing 34.

The bevel gear system includes a pair of side gears 49 and 50, which are connected to the shafts 38 and 37 respectively, to transmit rotational effort thereto. The side gears 49 and 50 are axially movable with respect to the shafts but are nonrotatable with respect thereto.

The bevel gear system further includes a pair of pinion gears 51, rotatably supported by a transversely extending pinion shaft 52. These gears are spaced equally distant from the longitudinal center line of the output shafts 37 and 38 in meshing engagement with the side gears 49 and 50. The shaft 52 is secured to the casing section 40 as by a dowel pin 53, and is therefore rotatable therewith.

It is preferred that the teeth of the pinion gears 51 and side gears 49 and 50 be of a configuration such that transmission of torque from the casing 34, pinion shaft 52 and pinion gears 51 to the side gears 49 and 50 results in a substantial axial force component parallel to the output shafts tending to separate the side gears. The purpose of this relationship will become apparent shortly.

When rotational effort is received by the differential casing 34 from the input shaft 23, the casing is caused to rotate about the longitudinal common center line of the input shaft 23 and the output shafts 37 and 38. Such action causes the pinion shaft 52 to revolve in a plane perpendicular to the center line, causing the pinion gears 51 to traverse a circular path about the output shafts. As the pinion gears 51 are interconnected with the side gears 49 and 50, rotational movement of the pinion gears with respect to the output shafts causes the side gears 49 and 50 to rotate about the axis of the output shafts. This rotation is transmitted from the side gear 49 to output shaft 38 and through rotary drive members 36 and 44 to drive shaft 15. Rotation is transmitted from side gear 50 to output shaft 37 to drive shaft 17.

When differential action is required, as when a vehicle is cornering or if the diameters between rear wheels and front wheels vary for any of a number of reasons, or when any other condition exists wherein one set of driving wheels is required to make a greater number of revolutions than the other, the pinion gears 51 not only revolve about the output shafts 37 and 38, but also rotate upon the pinion shaft 52 allowing relative movement between the side gears 49 and 50 and, consequently, relative rotation between shafts 37 and 38.

Under certain circumstances, the ability of the differential mechanism to provide for relative rotation between the output shafts is a disadvantage rather than an advantage. For example, when one set of driving wheels of a vehicle is on slippery pavement, and the other is on dry pavement, free differential action prevents the transmission of rotational effort to the wheels having the traction. The side gear associated with the wheels having the traction would remain stationary, and the pinion gears would revolve about it in their circular path about the output shafts, and simultaneously rotate about the pinion shaft resulting in rotation of only the wheels with less traction. To overcome this inherent operational characteristic, the differential mechanism 31 of the illustrated embodiment is provided with means for resisting differential action which means apply an initial predetermined minimum torque to the wheels having the greater traction. An additional cumulative torque will be applied to the drive axle having the greater traction as a function of input torque to the differential mechanism.

Accordingly, there is provided within the casing 34 a pair of truncated cone-shaped clutch members 55 disposed for frictional engagement with the conically shaped surface 47 formed on the interior of the cup-shaped sections 40 and 41. Each of the cone-shaped clutch members 55 is connected to one of the output shafts 37 or 38, so that the clutch member is nonrotatable with respect to the shaft and relative axial movement between the shaft and the clutch member is permitted. The clutch members 55 are spaced laterally outwardly from the transversely extending pinion shaft 52 with the side gear 49 or 50 of each shaft positioned intermediate the pinion shaft 52 and the clutch member 55. The clutch member 55 and the side gear associated with each shaft are in transverse abutting contact so that a force transmitting relationship between the side gear and the clutch member is established.

It should be appreciated that although the side gears and clutch members are depicted as separate elements, they may readily be formed as a single component without in any way departing from the scope of the present invention.

Frictional engagement of the clutch members is accomplished in two ways. First, an initial preload force holding the clutch members into frictional driving engagement with the drum surfaces 47 is provided by a spring back assembly 56 extending between the side gears 49 and 50 and transverse pinion shaft 52. Each spring pack consists of spring type Belleville washers 57. The spring washers 57 thus hold the clutch members 55 in constant contact with the surface 47 with a predetermined force. The size and number of the Belleville washers used in any particular application depends on the amount of preload spring force needed for that particular application.

The predetermined force exerted by the spring pack 56 holds the clutch members 55 in frictional engagement with the conical drum surfaces 47 of the cone-shaped drums 48 to provide driving engagement between them.

Since the clutch members 55 are connected to their respective output shafts 37 and 38, engagement of the cone-shaped clutch members 55 with the mating drum surfaces 47 of the differential casing 31 provide a means for transmission of rotational effort directly from the differential casing 34 to the shafts 37 and 38. Such a direct driving connection assures the transmission of a predetermined rotational effort to each of the output shafts independent of the tractive condition associated with the drive axle connected to the respective output shafts. In this manner, differentiation is retarded to the extent of the force holding said clutch members in engagement.

In addition to the initial preload of the clutch members provided by the spring pack assembly, lateral separating forces between the pinion and side gears further contribute to the force holding the clutch components in engagement.

As the torque input to the differential mechanism increases, the separating force upon the pinion and side gears also increases thus increasing the axial force exerted on the clutch members by the side gears. In this manner, the clutch members are held in engagement with additional force to provide a cumulative increase in the degree of restraint of differential action.

As explained in certain instances, relative rotation between output shafts is necessary to accomplish certain desired results, such as when a vehicle negotiates a corner or curve wherein the front set of wheels turn at a faster rate than the rear. In these circumstances, it is necessary that the clutch members have relative rotation with respect to the drum surface to allow relative movement of one shaft with respect to the other.

FIG. 3 shows a modified embodiment of the limited slip differential sometimes referred to as a reverse cone clutch type. The details and operation of a limited slip differential using the reverse cone structure are shown and described in copending application of Jack F. Engle entitled "Differential Mechanism", Ser. No. 842,182 filed July 16, 1969. The limited slip differential shown in FIG. 3 includes preloaded conical friction members which retard differential action and means to proportionally *decrease* the frictional preload force in response to increasing input torque.

A torque transmitting mechanism generally designated 66 is shown disposed in operative association with a pair of coaxially aligned, relatively rotatable output shafts 67 and 68 which extend from the torque transmitting mechanism in an axial direction on the opposite side of said mechanism as the input shaft, said output shafts being coaxial and telescoped one within the other. The shafts 107 and 108 are adapted to transmit rotational effort to load receiving members such as the drive shafts 17 and 15, respectively.

The torque transfer mechanism 66 includes a housing 70. An input shaft 71, driven by the transmission 11 is shown journaled for rotation in a bearing assembly 72 which is carried in the housing 70. The torque transmitting mechanism 66 includes a limited slip differential 73 driven by an input shaft 71. The differential 73 includes a casing 75 which is formed by a pair of generally cup-shaped sections 76 and 77. The section 76 is connected to the input shaft 71 for rotation therewith by any of a number of methods such as being splined thereon. The sections 76 and 77 are drivingly connected and retained in abutting relation by the bolt 78.

The shaft 68 is hollow and defines a circular cavity 80. The shaft 67 extends through the cavity 80 and is journaled within the cavity 80 for relative rotation with respect to shaft 68. The shaft 68 is connected to a rotary drive member 81. In the lower portion of the housing 70, a shaft 82 is supported for rotation by a bearing assembly 83 carried in the housing. The shaft 82 is adapted to be connected to the drive shaft 15. A rotary drive member 85 is carried by the shaft 82 and connected to the shaft for rotation therewith. A chain 86 drivingly connects the rotary drive members 81 and 85 and serves to complete the path to transmit torque from the output shaft 68 to the drive shaft 15.

A bevel gear system generally designated 87 is connected between the casing 75 and the shafts 67 and 68 and transmits rotational effort to the shafts while simultaneously allowing relative rotation between them when required.

A pair of friction clutches 88 provide the desired resistance to differential action. Each clutch includes a friction surface associated with the casing 75 and a friction surface associated with one of the output shafts. Frictional contact of these surfaces provides a direct path for transmission of rotational effort from the casing to the output shafts independent the bevel gear system. The clutches thus modify the normal differential characteristics of the mechanism and thus, torque is adapted to be transmitted to both shafts even though they may experience unequal loading or traction.

The friction surfaces of the clutches 88 are maintained in contact by spring packs 90 with a predetermined force to provide a preload to ensure a predetermined initial resistance to differential action.

Each of the clutches in the illustrated embodiment includes a removable insert 91 which is connected to the casing 75 for rotation therewith and which forms the friction surface of the clutches associated with the casing.

Referring now to the bevel gear system 87, there is provided an arrangement which transmits output torque to the shafts 67 and 68 and simultaneously allows relative rotation between shafts when necessary, as when a vehicle is cornering.

The bevel gear system includes a pair of side gears 92 and 93 which are connected respectively to the shafts 67 and 68 for rotational movement therewith. To effect this relationship between the shafts and the side gears, the adjacent ends of the shafts and the internal bore of the gears are splined whereby axial movement of the shafts relative to the gears is permitted.

The side gears 92 and 93 are in constant mesh with at least a pair of pinion gears 95 which are supported by a pinion pin 96 disposed intermediate the side gears 92 and 93 secured to the casing for rotation therewith.

It is preferred that the teeth of the pinion gears and the side gears be of a configuration such that transmission of torque from the case by way of the pinion pin and pinion gears to the side gears results in a substantial axial force component upon the side gears in a direction parallel to the output shafts and outward from the center of the differential unit. The purpose of this relationship will become apparent shortly.

As can be appreciated, rotation of the differential casing 75 by the input shaft 71 causes the pinion pin 96 to revolve about the center line of the shafts 67 and 68. The pinion gears 95, therefore, transcribe a generally circular path about the center line of the shafts, and as they are in mesh with the side gears 92 and 93, the side gears are caused to rotate and thereby transmit torsional effort to the output shafts 67 and 68.

If one of the output shafts is required to rotate at a different speed from the other, the pinion gears 95 not only revolve about the center line of the output shafts, but also rotate about the pinion pin 96 allowing relative rotational movement between the side gears 92 and 93. Consequently, the output shafts rotate relative to each other as well as relative to the casing.

Differentiation, i.e., relative rotation between the shafts, inherently possible by virtue of the above described structure, is resisted by the clutches 112. Each of these clutches includes a frustoconical clutch member 98 and one of the cone seat inserts 91 frictionally contacted by the member 98 along a complementary conical surface.

Each clutch member 98 includes an internally splined bore 99 connected to one of the shafts and is, therefore, rotatable with the shaft. Each of the clutch members 98 is disposed between a side wall 101 of the casing 110 and one of the side gears. The respective side gear and the clutch member of each of the shafts are in radial contact along a surface 102 and are thereby in a force transmitting relationship.

Axial force upon each clutch member 98 is provided by a separate spring pack 90. Each spring pack consists of spring type Belleville washers 104 acting between the side wall 101 and the clutch members 98. The spring washers 104 thus hold the clutch members 98 in constant contact with the inserts 91 with a predetermined force. The size and number of the Belleville washers used in any particular application depends on the amount of preload spring force needed or desired for that particular application.

The conical drum and/or seat surfaces contacted are provided by the removable inserts 91 which form the friction surfaces of the clutches 88 associated with the casing 75.

The inserts 91 include a generally cylindrical wall portion 105 which fits inside the casing 75. The insert 91 is held against rotation relative to the casing 110 by the pinion pin 96. A cone-shaped friction surface 107 is formed inside the insert 91.

The insert may be formed of any suitable material such as, for example, steel, and may be made by any one of several manufacturing processes such as stamping, turning, spinning, grinding, etc.

The cone-shaped surface 107 is such that it diverges toward the outboard edges of the mechanism. That is, the large end of the cone is directed toward the side walls 101 of the casing. The clutch member 98 fits inside the insert, the cone surface thereof being in frictional contact with the surface 107. Such an arrangement makes a compact clutch contained completely within the differential case and closely adjacent to the side gears from which the force opposing the spring force is derived.

The operation of the limited-slip differential shown in FIG. 3 and described herein is as follows. With the differential mechanism at rest, the spring 104 urges the clutch member 98 into contact with insert 91 which is held fast to the casing 74. This frictional contact provides initial torsional resistance or prevailing preload. This clutching action would tend to drive the shafts 67 and 68 in unison with the casing 75. Upon rotation of the input shaft 71, the casing 75 will be rotated and along with it, the pinions 95 which drive the side gears 92 and 93 to rotate shafts 67 and 68. However, as input torque is applied, a force between the intermeshing teeth of the pinions and the side gears acts in opposition to the spring force providing the initial torsional resistance. The force generated by the intermeshing teeth is directly proportional to the traction available at the wheels. The force transmitted axially against the clutch members 98 by the side gears 92 and 93 results in proportional reduction of the total force holding the clutch members in contact. The force transmitted by the side gears reducing the contacting force of the clutch members therefore facilitates the taking place of the necessary differential action.

It should be understood that the tooth form used on bevel gears 92, 93 and 95 and the load of the spring packs 90 is such that for any particular vehicle, the force of the spring packs 90 will always exceed the axial force transmitted by the teeth of the bevel gears even under conditions of maximum input torque to the differential. Thus, the clutches 112 provide torsional proportioned resistance for all conditions of operation of the differential. Since the load imposed by spring packs 90 on the clutch members 98 always exceeds the axial force produced on the side gears 92 and 93 by the intermeshing teeth, it will be clear that the side gears do not move axially during operation of the unit.

The principle of operation of the differential is that the side gears 92 and 93 impose a variable force on the clutch members 98 in opposition to spring packs 90 and therefore reduce the total force holding the clutches 112 in contact in proportion to the torque transmitted through the differential. The side gears 92 and 93 thus constitute a variable force-imposing means for clutches 112 but do not move axially. Since the unit provides that under torque transmitting conditions the total force holding the clutches in contact is reduced, it will be seen that there is less resistance to differential action when turning a corner with torque being applied to the differential than in certain prior art devices which, under the same conditions, would increase the torsional resistance to differential action at a time when it is not desired.

Various of the features of the invention have been particularly shown and described, however, it should be obvious to one skilled in the art that various modifications may be made therein without departing from the scope of the invention.

What is claimed is:

1. A multiple path drive system for a vehicle having at least two pairs of traction wheels including a pair of axle assemblies; each assembly connected to at least one pair of traction wheels; a pair of drive shaft members each connected as an input to an axle assembly; a torque transfer mechanism including a differential comprising an input shaft adapted to receive an input torque, said input shaft having a central axis and axially extending from one side of said differential mechanism; a casing member driven by said input shaft; pair of output gears positioned within and on opposite sides of said casing member; a bevel gear system connected between said casing member and said output gears to transmit torsional effort from said casing member to said output gears and to allow relative rotation between said output gears; a pair of output shafts coaxial with said input shaft, each connected to a respective output gear, each of said output shafts in driving engagement with one of said drive shafts and both output shafts axially extending from said differential mechanism in a direction axially opposite to said input shaft, said output shafts being coaxial and telescoped one within the other and including at least one clutch positioned between said casing and at least one of said output shafts, said clutch including at least one friction surface associated with said casing and at least one friction surface associated with said one of said output shafts and means urging said friction surfaces into an initial frictional engagement.

2. A multiple path drive system as in claim 1, in which said means urging said frictional surfaces into an initial frictional engagement include a plurality of preload springs adapted to develop a predetermined frictional engagement.

3. A multiple path drive system as in claim 1 including means to increase the clutch engaging force as the torque input to the mechanism increases.

4. A multiple path drive system as in claim 1 whereby said means urging said friction surfaces into an initial frictional engagement include resilient means adapted to exert a predetermined force on said friction surfaces, said differential mechanism further including means responsive to torque applied to the mechanism to effectively decrease the force exerted by said resilient means proportionately with increasing input torque.

5. A multiple path drive system as claimed in claim 1 in which said clutch includes first and second clutch members defining complementary frustoconical surfaces, said first clutch member comprising a removable insert adapted to be securely held to said casing and having a conical surface converging toward the center of said casing, said second clutch member connected to said output shaft for rotation therewith and defining a conical surface adapted to contact said first clutch member.

6. A multiple path drive system as in claim 1 in which said casing member includes at least one conically shaped drum surface formed on the interior of said casing and at least one frustoconically shaped clutch member disposed within said casing and connected to one of said output shafts.

* * * * *

UNITED STATES PATENT OFFICE
CERTIFICATE OF CORRECTION

Patent No. 3,650,349     Dated March 21, 1972

Inventor(s) Richard E. Cleveland et al

It is certified that error appears in the above-identified patent and that said Letters Patent are hereby corrected as shown below:

On the cover sheet [54] in the title "STRIP" should read -- SLIP --.

Signed and sealed this 7th day of November 1972.

(SEAL)
Attest:

EDWARD M. FLETCHER, JR.
Attesting Officer

ROBERT GOTTSCHALK
Commissioner of Patents